US011157523B2

(12) United States Patent
Chan et al.

(10) Patent No.: US 11,157,523 B2
(45) Date of Patent: Oct. 26, 2021

(54) STRUCTURED DATA CORRELATION FROM INTERNAL AND EXTERNAL KNOWLEDGE BASES

(71) Applicant: INTERNATIONAL BUSINESS MACHINES CORPORATION, Armonk, NY (US)

(72) Inventors: Yuk L. Chan, Rochester, NY (US); Ea-Ee Jan, Ardsley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 15/843,582

(22) Filed: Dec. 15, 2017

(65) Prior Publication Data
US 2019/0188286 A1  Jun. 20, 2019

(51) Int. Cl.
*G06F 16/21* (2019.01)
*G06F 16/28* (2019.01)
*G06Q 30/02* (2012.01)
*G06F 16/27* (2019.01)
*G06F 16/215* (2019.01)

(52) U.S. Cl.
CPC ............ *G06F 16/285* (2019.01); *G06F 16/21* (2019.01); *G06F 16/215* (2019.01); *G06F 16/27* (2019.01); *G06Q 30/0201* (2013.01)

(58) Field of Classification Search
CPC ........ G06F 16/21; G06F 16/285; G06F 17/30; G06F 16/27; G06F 17/285; G06Q 30/0201
USPC ........................................................ 707/738
See application file for complete search history.

(56) References Cited

U.S. PATENT DOCUMENTS

| 7,752,158 | B2 | 7/2010 | Wookey | |
| 2004/0093331 | A1* | 5/2004 | Garner | G06N 5/022 |
| 2013/0117219 | A1* | 5/2013 | Malka | G06F 16/215 |
| | | | | 707/603 |

(Continued)

OTHER PUBLICATIONS

He, Wu, et al., "Managing Extracted Knowledge from Big Social Media Data for Business Decision Making," Journal of Knowledge Management 21, No. 2, 2017, pp. 275-294.

(Continued)

*Primary Examiner* — Hosain T Alam
*Assistant Examiner* — Tracy M McGhee
(74) *Attorney, Agent, or Firm* — Cantor Colburn LLP; Teddi Maranzano

(57) ABSTRACT

A computer-implemented method for generating a database of business cases correlated datasets includes receiving a text string indicating a business case topic. The processor isolates a plurality of data types in the dataset that are associated with the business case topic, and correlates the business case topic with the data types. The processor then determines data type links that associate the business case topic with the correlated data types. The processor evaluates each of the one or more data type links for a correlation to the business case topic, and assigns a confidence level value for the correlation. The processor next assigns a business value score for the correlated data type links based on the confidence level value and generates a business case database. The business case database is generated using the plurality of data types, the confidence level for each data type link and the business value scores.

20 Claims, 6 Drawing Sheets

(56) References Cited

U.S. PATENT DOCUMENTS

2014/0324521 A1* 10/2014 Mun ..................... G06Q 10/04
705/7.28
2016/0379139 A1   12/2016 Eldar et al.

OTHER PUBLICATIONS

Roelof Van Zwol, et al., "Method and System for Discovering Entity Facets," IP.com No. IPCOM000204178D, Feb. 17, 2011, 2 pages.

* cited by examiner

STRUCTURED DATA CORRELATION FROM INTERNAL AND EXTERNAL KNOWLEDGE BASES

BACKGROUND

The present invention relates to computer-driven data mining of structured data from various knowledge bases, and more specifically, to structured data correlation from internal and external knowledge bases.

In today's global environment, computer-generated data is now considered a valued resource of our economy. Acquiring data with business value is an important part of business and technology solutions. Many companies leverage and collect data from their existing customer base, and some companies also acquire the data through acquisition or partnership with others that have the data.

SUMMARY

Embodiments of the present invention are directed to a computer-implemented method for generating a database of business cases correlated datasets. The method includes receiving a text string indicative of a business case topic using a processor and parsing a dataset using the processor. The processor isolates a plurality of data types in the dataset that are associated with the business case topic. The processor correlates the business case topic with one or more data types from the plurality of data types and determines one or more data type links that associate the business case topic with each of the one or more correlated data types. The processor evaluates each of the one or more data type links for a correlation to the business case topic and assigns a confidence level value for the correlation. The processor next assigns a business value score for each of the one or more correlated data type links based on the confidence level value and generates a business case database. The business case database is generated using the plurality of data types, the confidence level for each data type link, and the business value score for each data type link.

A system and a computer program product are also described for performing the computer-implemented method above.

DETAILED DESCRIPTION

Analytics are applied to computer-generated data to mine for insights and identify patterns that are useful in the development of the business. Identification of correlations and relationships between certain activities or phenomena and resulting effects of those activities or phenomena have a great business and economic value for improvement in products, services, gaining efficiencies, and for improving further business-related predictions. When a company makes an acquisition, form joint venture or partnership, the relationship with a second company often includes the acquisition or sharing of a body of data (referred to hereafter as an internal database) associated with the products and/or services offered by the second company. It may be beneficial to provide a system that identifies, using automated processing techniques, additional data that may be missing from the internal database that would offer significant business value. It would also be beneficial to provide a system that can automatically evaluate internal databases and publicly available databases for the potentially beneficial information, and create a new structured database of that data. Moreover, it is beneficial to provide a method for acquiring that data in the created database, in cases where the system cannot mine the data and organize it autonomously.

Figure 1:
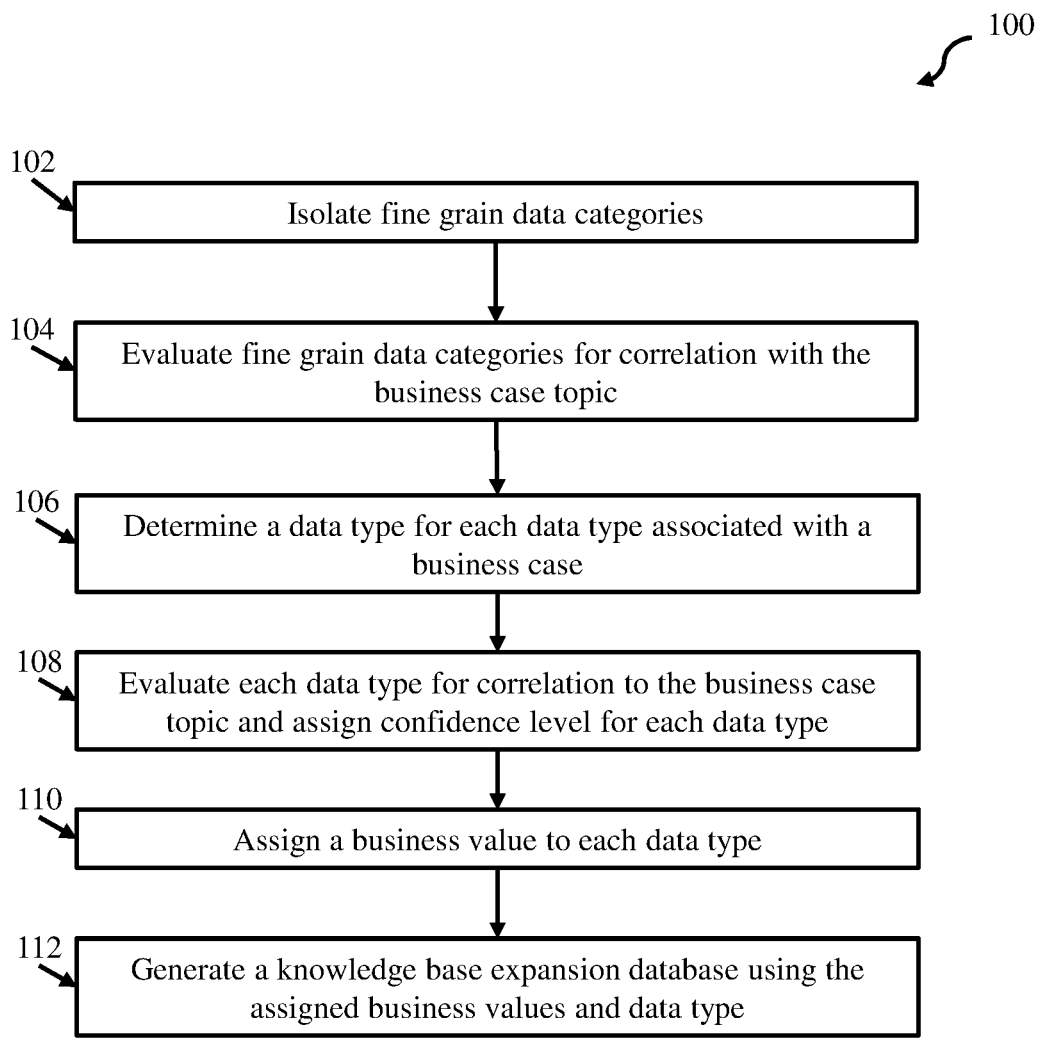
FIG. 1 depicts a flow diagram of a method for computer-driven correlation of structured data sets mined from internal and external knowledge bases according to an embodiment.

FIG. 1 depicts a flow diagram of a method 100 for computer-driven correlation of structured data sets mined from internal and external knowledge bases, according to an embodiment. As shown in block 102, a system processor such as the processor 501 depicted in FIG. 5, takes as its only input a text string indicative of a business case topic. A business case topic is descriptive of a service or product associated with a business at issue. For example, an energy-related company may buy and sell energy. A business case topic could be, in this example, the text string "reduce energy." "Other examples could be one or more of the text strings, determine efficiency of heating," or "reduction of energy consumption,"" etc. In some aspects, the text string may include several related topics (e.g., "thermostat temperature management, and hot water consumption, and heating bills") where the several topics in the string are all related to the company product of energy production. While energy production and related topics are used herein as an example, it should be appreciated that any business type and any associated business topic is contemplated.

As described above, companies often have access to private bodies of data that are not publicly accessible. For example, the energy producing company above may have a database with private addresses, energy consumption records associated with each of the private addresses, payment histories, information indicating whether the address is a business or residence, etc. On the other hand, publicly available databases associated with the business case topic also exist, which are available to the public via the Internet. For example, staying with the energy production company example, wiki articles are available for topics such as types of heating in homes, types of thermostats in current use, insulation in homes and commercial structures, research publications, etc. In other aspects, private business and manufacturers also publish material and post the material on a publicly-accessible website. These are all examples of publicly available databases.

Referring again to FIG. 1, at block 102, after the initial step of receiving the text string, and saving the business case topic to a computer memory, the processor 501 isolates fine grain data types associated with the business case topic. Fine grain data types are categories and/or types of data associated with the business topic. The data types may include, for example, specific categories of products associated with the business case topic. In other aspects, the data types may be associated with a consumer motivation to use a product (e.g., stormy weather patterns). In other aspects, the data types may be consumer responses to topic-related stimuli, such as hot water consumption responsive to cold weather, cold water consumption responsive to hot weather, heating bills, etc. It is contemplated that many data types are plausible.

As shown in block 104, the processor 501 evaluates the fine grain data types in the knowledge base for correlations with the business case topic. In some aspects, the processor 501 performs this process by parsing a dataset and isolating a plurality of data types in the dataset associated with the business case topic. The dataset may be an internal database or an external database, as described above. A correlation may be, for example, thermostat information correlated with a business case topic "energy." As another example, a correlation may be an association of a topic like automobile insurance with publicly available information such as "vehicle registrations in Vermont." These examples are not intended to be limiting but serve as examples of associations/correlations between a broad topic and a finer grain data type.

The processor 501 determines one or more data type links that associate the business case topic with each of the one or more correlated data types, as shown in block 106. A data type link is an association of a data type (e.g., energy usage records) with the business case topic. The data type may be indicative of the type of record (e.g., an automobile registration). The data type may also be indicative of the public or private nature of the information. For example, a data type may be public utility information, whereas private data types may include particular records associated with an individual address or occupant.

At block 108, according to an embodiment, the processor 501 evaluates each of the one or more data type links for a correlation to the business case topic and assigns a confidence level value for the correlation. A confidence level value may be a value corresponding to the qualitative quality of the match between the business case topic and the data type link made between a particular data type selected by the system and that specific business case topic. For example, the processor 501 may determine whether the missing data type is optional or necessary to enable the business case. In one aspect, the processor 501 performs a Monte Carlo Simulation to determine the correlation. In another aspect, the processor 501 quantifies the correlation using the correlation coefficient of a statistical analysis between the business case topic and the correlated data link type. Other methods for associating a correlation value are contemplated and well understood in the art.

As shown in block 110, the processor 501 assigns a business value score for each of the one or more correlated data type links based on the confidence level value. The business value score quantifies a relative value a data type (and corresponding data type) has on the business case topic. For example, the closer a connection between the missing data and a result expressed as the business case topic, the higher a business value score is assigned to that data type. For example, if the business case topic is energy usage in a part of a city, then a direct correlation is appreciable between a data type of "volume of light fixture type x sold within a 20 mile radius of location y." The effect that a light fixture has on an amount of energy consumed is direct, and thus, a business value score scaled from 1 to 10 could score 6, 7, 8, etc. On the other hand, if the same business case topic is used but the data type "train ticket sales at station y" is correlated by the system as a data type link, the business case correlation is appreciably weaker than the light fixture example, because train ticket sales may be marginally related (e.g., a personal automobile that is electric only is not used in lieu of the purchase of a train ticket). Accordingly, the processor 501 assigns a business value to each of the data type links.

Figure 5:
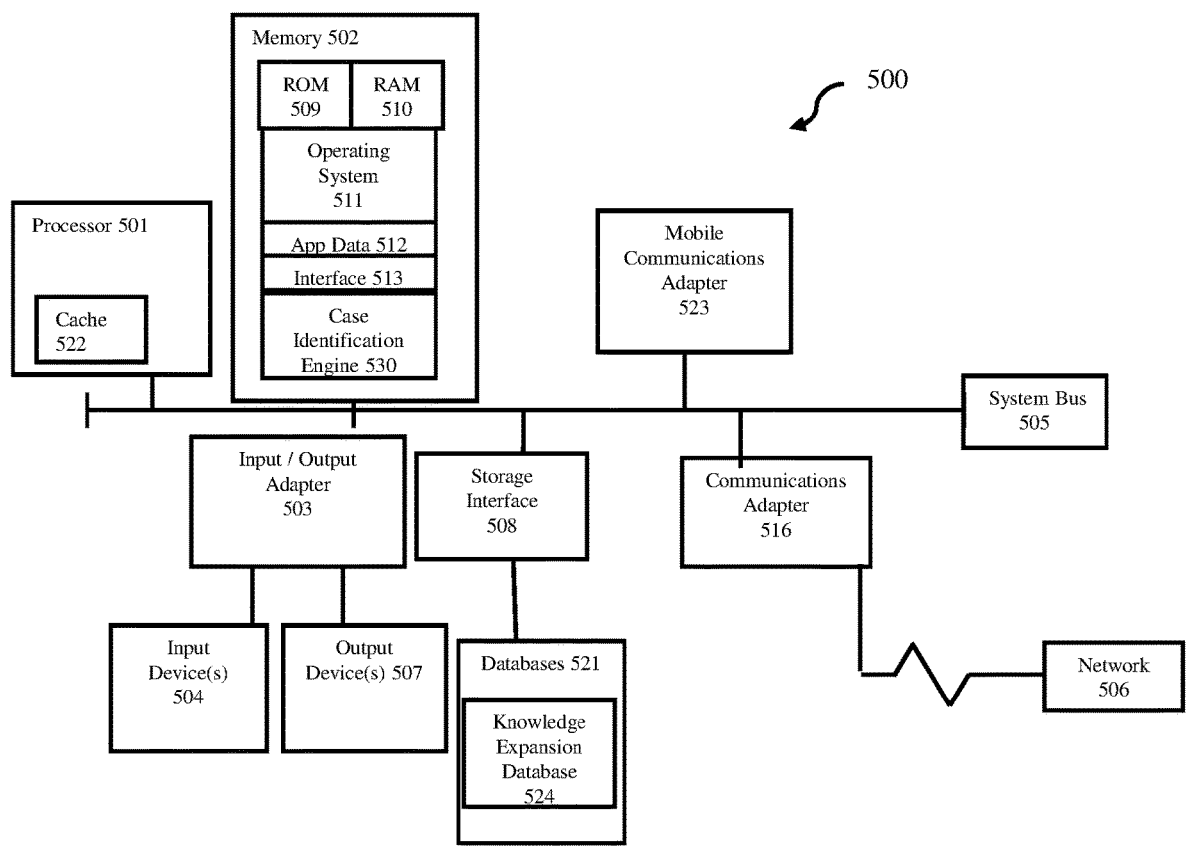
FIG. 5 depicts a block diagram of a computer system and environment, according to one embodiment.

At block 112, the processor 501 generates a business case database (e.g., the knowledge expansion database 524, as shown in FIG. 5). The processor 501 generates the database 524 using the plurality of data types, the confidence level for each data type link and the business value score for each data type link.

In other aspects, correlating the business case topic with the one or more data types includes identifying, using the processor 501, a missing data type from the one or more data types, and generating a case report based on the knowledge expansion database indicative of an option for acquiring the missing data type. The case report is automatically generated by the processor 501 by determining how the missing data can be retrieved and writing the retrieval method in a data structure in the knowledge expansion database. For example, the processor 501 may determine that a strong correlation exists between energy usage data from a federal database that is not accessible without proper credentialing and a password. The processor 501 may evaluate the logical path (via the Internet) to the desired information, evaluate any credentials that are required for its access, and record a website address for acquiring the credentials. In some aspects, the processor will write to a data structure in the memory 402 (FIG. 5) the website address for obtaining the credentials, the information associated with the correlated business case topic with the data type, the business value score for the missing information, and the correlation value that identifies the quality of the match between the business case topic and the data type of the missing data.

Figure 2A:
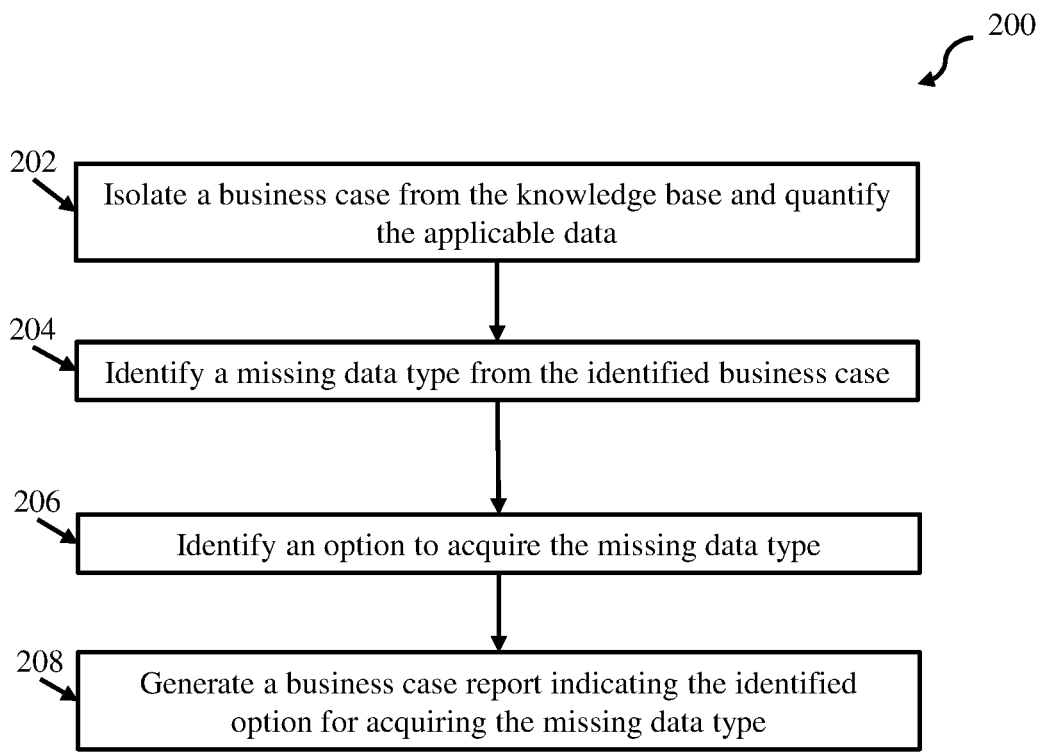
FIG. 2A depicts a flow diagram of a method for computer-driven correlation of business case topic with data types according to an embodiment.

FIG. 2A depicts a flow diagram of a method 200 for computer-driven correlation of a business case topic with one or more data types, according to an embodiment. As shown in block 202, the processor 501 may isolate a business case from the knowledge base and quantify the applicable data. Accordingly, the processor 501 isolates information from the parsed database, where the information isolated is associated with the business case topic from the dataset. To determine a qualitative affect, the processor 501 evaluates whether the data type affects the business value score by a predetermined threshold percentage. A predetermined threshold percentage may be, for example, 20% or greater. Any threshold score is possible, which may be user selected via a user interface.

As shown in block 204, the processor 501 identifies a missing data type from the one or more data types, and generates a case report based on a knowledge expansion database indicative of an option for acquiring the missing data type. As explained above, according to some embodiments, the case report is automatically generated by the processor 501 by determining how the missing data can be retrieved and writing the retrieval method in a data structure in the knowledge expansion database 524.

Figure 2B:
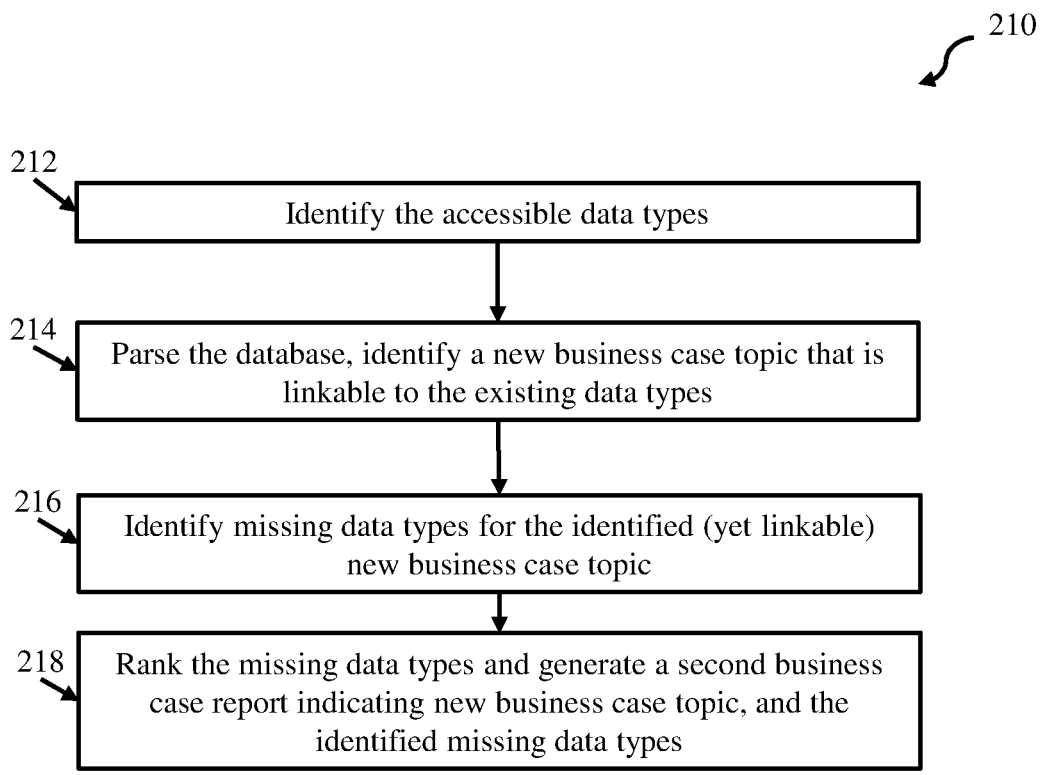
FIG. 2B depicts a flow diagram of another method for computer-driven correlation of a business case topic with one or more data types according to another embodiment.

FIG. 2B depicts a flow diagram of another method 210 for computer-driven correlation of a business case topic with one or more data types, according to another embodiment. More specifically, the method 210 provides a method for identifying missing data. It may be advantageous in some circumstances to evaluate internal and external databases to identify and isolate business case topics that are correlated with existing data types in the system. In one aspect, the method 210 widens the scope of one or more existing data type to include correlated yet previously unknown business case topics that are accessible to the processor 501. The databases may be internal or external. Existing data type can be data that a first company already own or has access to. By using the existing data types from first company with missing data types available from the second company (and, not available from the first company), additional business use cases can be enabled. These business case can apply analytic, statistical method and logical reasoning to the existing data type and missing data types; and evaluate or project for business case such as energy efficiency, risk of high blood pressure, auto accident rate etc.

As shown in block 212, in one aspect, the processor 501 determines the available data types accessible via an operative connection (e.g., the Internet, a local area network, a cloud computing environment, etc.).

As depicted in block 214, the processor 501 parses one or more internal databases or an external databases, creates a list of at least one business case topic that the previously identified data types can enable. For example, the processor 501 may parse an external wiki site (e.g., an external database), and more particularly, parse a topic or linked set of topics referenced in the wiki site, and generate a list of that topic or linked set of topics identified by the processor 501 as correlated topics to existing data types. The data types are existing in that they are linked to existing (known) business cases stored in memory. In one aspect, a linkable business case topic has a correlation value that exceeds the predetermined threshold value, or exceeds a second predetermined threshold value that may be greater than the first threshold value. In this embodiment, the list generated by the processor 501 is saved to a computer-readable memory.

At block 216, the processor 501 identifies the missing data types associated with the newly-identified business case topic. For each of the missing data types identified, the processor 501 ranks each of the missing data types according to predetermined ranking criteria, as shown in block 218.

The ranking is made using various ranking criteria, according to different embodiments. For example, in one aspect, the processor 501 ranks the missing data type using a business value score of the business case topic.

According to another embodiment, the processor 501 ranks the missing data type based on a number of existing data types that are already known and associated with the business case topic. For example, if the business case topic previously associated with data types is "types of automobiles used in Milwaukee, Wis.", and a data type in existence (known by the processor 501 and associated already with the business topic) includes the data type "quantity of brand XYZ vehicles sold in Wisconsin in 2017," then the newly discovered business case topic associated with the "quantity of brand ZYZ vehicles" data type may be "fuel consumption." In this example, a missing data type may be "fuel consumption projections for 2018 in the Midwest." In one aspect, the processor 501 may identify one or more data types that are missing but still linkable to this new business case topic. As another example, the data types associated with fuel consumption projection in 2018 in the Midwest would be useful to making the business case (where the usefulness is a data type having a business value score above the threshold). The missing data types could include "fuel consumption by make and model," and "fuel consumption by grade of fuel in sub-zero temperatures." Because sub-zero temperatures are now linked with business case topics in the Midwest, then the processor 501 may next associate future occurrences of a Midwest-related topics having with a cold temperature relatable business topic, where that connection may not have been immediately relatable using conventional matching methods.

In another aspect, the processor 501 ranks the missing data type using a cost basis associated with acquiring the one or more missing data types for the new business case topic. For example, if the processor 501 determines that a subscription is necessary to obtain the data, the cost of the subscription may be used as a weighted value for the overall ranking. In one aspect, the higher the correlation but lower the cost could affect the ranking in a positive way (making the correlation higher ranked, e.g., 7 out of 10). In another aspect, the lower the correlation and higher the cost effects the ranking in a negative way (making the correlation ranked low, e.g., 2 out of 10).

In another embodiment, the processor 501 rank the missing data type based on a relative ability for the missing data type to satisfy two or more business case topics. In this aspect, the processor may evaluate the relative ability to apply that data type to the newly discovered business case topic, and use that quantified ability as an "ease of enablement" score. The ease of enablement score is weighted by the processor 501 based on the number of business case topics satisfied by the addition of the single missing data type at issue. For example, a missing data type identified by the processor 501 may satisfy four different newly-discovered business case topics. Despite having a medium to low business value score with respect to one of the (new) business case topics, the missing data type is ranked highly (e.g., 6 out of 10) by the processor for its cumulative effect on the plurality of newly-discovered business case topics (in that it satisfies multiple business case topics simultaneously).

As shown in block 218, the processor 501 generates a second business case report that indicates the new business case topic and the identified missing data type(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model

On-demand self-service: a cloud consumer can unilaterally provision computing capabilities, such as server time and network storage, as needed automatically without requiring human interaction with the service's provider.

Broad network access: capabilities are available over a network (e.g., network 506, as depicted in FIG. 5) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 506, as depicted in FIG. 5), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 506, as depicted in FIG. 5), servers, operating systems, or storage, but has control over the deployed applications and possibly application hosting environment configurations.

Infrastructure as a Service (IaaS): the capability provided to the consumer is to provision processing, storage, networks (e.g., network 506, as depicted in FIG. 5), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 3:
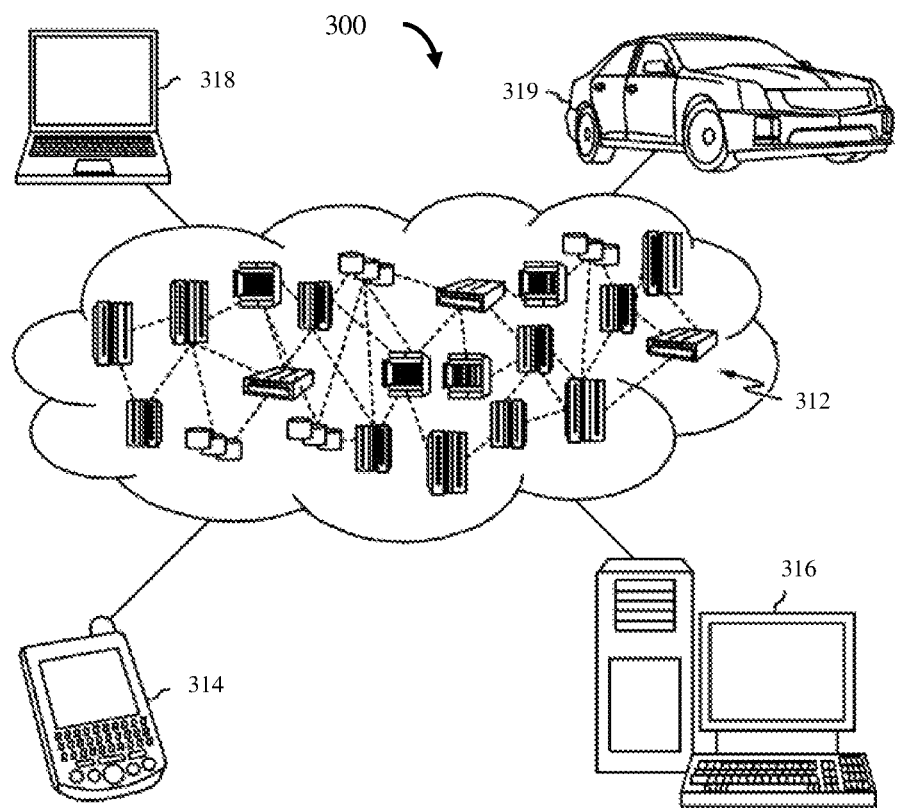
FIG. 3 depicts a cloud computing environment, according to one embodiment.

Referring now to FIG. 3, a cloud computing environment 300 for use in practicing the teachings herein is depicted. As shown in FIG. 3, cloud computing environment 300 comprises one or more cloud computing nodes 312 with which local computing devices used by cloud consumers, such as, for example, a mobile device 314, a desktop computer 316, a laptop computer 318, and/or an automobile computer system 319 can communicate. Cloud computing nodes 312 can communicate with one another. They can be grouped (not shown) physically or virtually, in one or more networks 310, such as a Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 314-319 shown in FIG. 3 are intended to be illustrative only and that cloud computing nodes 312 and cloud computing environment 300 can communicate with any type of computerized device over any type of network and/or network addressable connection (e.g., using a web browser).

Figure 4:
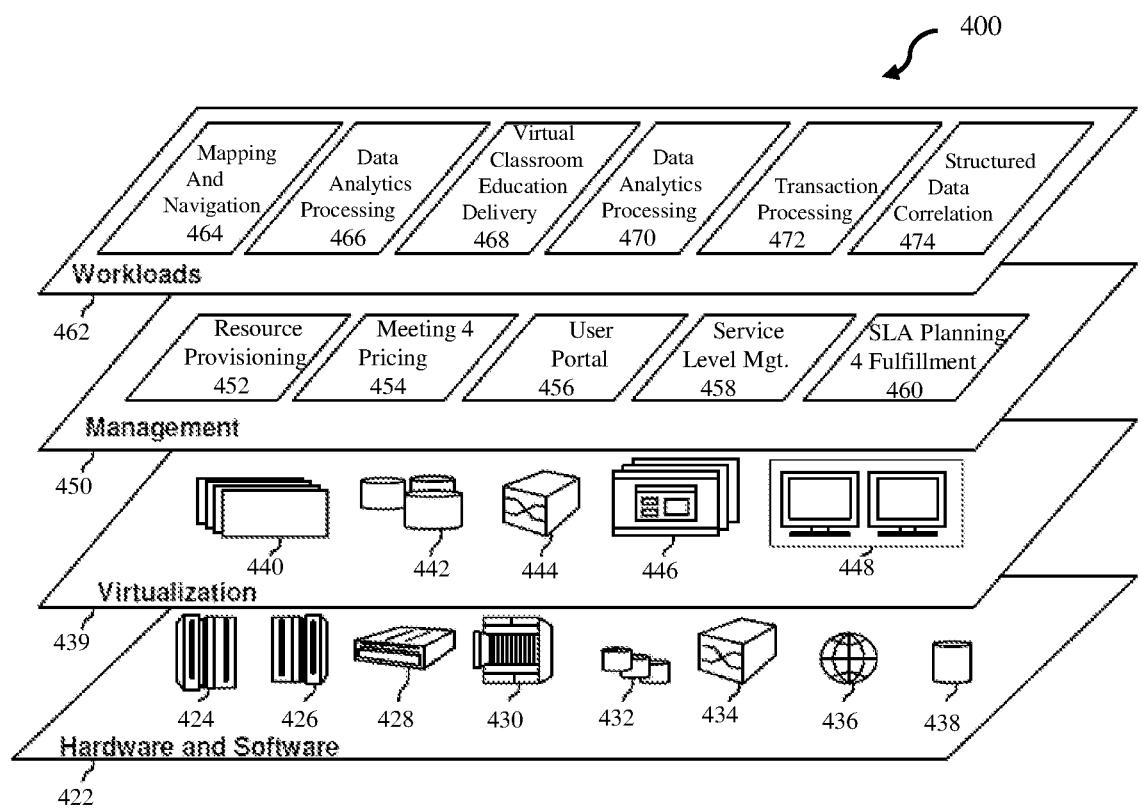
FIG. 4 depicts abstraction model layers, according to one embodiment.

Referring now to FIG. 4, a set of functional abstraction layers 420 provided by cloud computing environment 410 (as depicted in FIG. 3) is shown. It should be appreciated that the components, layers, and functions of functional abstraction layers 420 depicted in FIG. 4 are illustrative only, and embodiments of the invention are not limited thereto. As depicted, the following layers and corresponding functions are provided:

A hardware and software layer 422 can include hardware and software components. Examples of hardware components can include, for example, mainframes 424, 4RISC (Reduced Instruction Set Computer) architecture based servers 426, servers 428, blade servers 430, storage devices 432, and networks and networking components 434. In some embodiments, software components include network application server software 436 and database software 438.

A virtualization layer 439 can provide an abstraction layer from which the following examples of virtual entities can be provided: virtual servers 440, virtual storage 442, virtual networks 444, which can include virtual private networks, virtual applications and operating systems 446, and virtual clients 448.

In one example, a management layer 450 can provide the functions described below. A resource provisioning module 452 can provide dynamic procurement of computing resources and other resources that can be utilized to perform tasks within the cloud computing environment. A metering and pricing resource 454 can provide cost tracking as resources are utilized within the cloud computing environment, and billing or invoicing for consumption of these resources. In one example, metering and pricing resources can include application software licenses. A user portal 456 can provide access to cloud computing environment 300 for consumers and system administrators (not shown). In some embodiments, user portal 456 can provide security and/or identity verification for cloud consumers (e.g., one or more consumers operating one or more of computing devices 314-319) and tasks, as well as protection for data and other resources. A service level management resource 458 can provide cloud computing resource allocation and management such that required service levels are met. A service level agreement (SLA) planning and fulfillment resource 460 can provide pre-arrangement for, and procurement of cloud computing resources for which a future requirement is anticipated in accordance with an SLA.

A workloads layer 462 can provide functionality for which the cloud computing environment can be utilized. For example, workloads layer 462 can include a mapping and navigation resource 464, a software development and lifecycle management resource 466, a virtual classroom education delivery resource 468, a data analytics processing resource 470, a transaction processing resource 472, and the structured data correlation 474.

FIG. 5 illustrates a block diagram of an exemplary computing environment and computer system 500 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 500 therefore can embody a general-purpose computer. In another exemplary embodiment, the implementation can be part of a mobile device, such as, for example, a mobile phone, a personal data assistant (PDA), a tablet computer, etc.

As shown in FIG. 5, the computer 500 includes processor 501. Computer 500 also includes memory 502 communicatively coupled to processor 501, and one or more input/output adapters 503 that can be communicatively coupled via system bus 505. Memory 502 can be communicatively coupled to one or more internal or external memory devices via a storage interface 508. Communications adapter 516 can communicatively connect computer 500 to one or more networks 506. System bus 505 can communicatively connect one or more user interfaces via input/output (I/O) adapter 503. I/O adapter 503 can connect a plurality of input devices 504 to computer 500. Input devices can include, for example, a keyboard, a mouse, a microphone, a sensor, etc. System bus 505 can also communicatively connect one or more output devices 507 via I/O adapter 503. Output device 507 can include, for example, a display, a speaker, a touchscreen, etc.

Processor 501 is a hardware device for executing program instructions (aka software), stored in a computer-readable memory (e.g., memory 502). Processor 501 can be any custom made or commercially available processor, a central processing unit (CPU), a plurality of CPUs, an auxiliary processor among several other processors associated with the computer 500, a semiconductor based microprocessor (in the form of a microchip or chip set), or generally any device for executing instructions. Processor 501 can include a cache memory 522, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 can be organized as a hierarchy of more cache levels (L1, L2, etc.).

Processor 501 can be disposed in communication with one or more memory devices (e.g., RAM 509, ROM 510, one or more external databases 521, etc.) via a storage interface 508. Storage interface 508 can also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 502 can incorporate electronic, magnetic, optical, and/or other types of non-transitory computer-readable storage media. Memory 502 can also be a distributed architecture, where various components are situated remote from one another, but can be accessed by processor 501.

The instructions in memory 502 can include one or more separate programs, each of which can include an ordered listing of computer-executable instructions for implementing logical functions. In the example of FIG. 5, the instructions in memory 502 can include an operating system 511. Operating system 511 can control the execution of other computer programs and provides scheduling, input-output control, file and data management, memory management, and communication control and related services.

The program instructions stored in memory 502 can further include application data 512, and for a user interface 513.

Memory 502 can also include program instructions for a case identification engine 530, configured to perform the parsing, correlating, determination of the data type links, evaluation of those links, assigning business value scores, and generation of the business case database, among other functions.

I/O adapter 503 can be, for example but not limited to, one or more buses or other wired or wireless connections. I/O adapter 503 can have additional elements (which are omitted for simplicity) such as controllers, microprocessors, buffers (caches), drivers, repeaters, and receivers, which can work in concert to enable communications. Further, I/O adapter 503 can facilitate address, control, and/or data connections to enable appropriate communications among the aforementioned components.

I/O adapter 503 can further include a display adapter coupled to one or more displays. I/O adapter 503 can be configured to operatively connect one or more input/output (I/O) devices 507 to computer 500. For example, I/O 503 can connect a keyboard and mouse, a touchscreen, a speaker, a haptic output device, or other output device. Output devices 507 can include but are not limited to a printer, a scanner, and/or the like. Other output devices can also be included, although not shown. Finally, the I/O devices connectable to I/O adapter 503 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 500 can include a mobile communications adapter 523. Mobile communications adapter 523 can include GPS, cellular, mobile, and/or other communications protocols for wireless communication.

In some embodiments, computer 500 can further include communications adapter 516 for coupling to a network 506.

Network 506 can be an IP-based network for communication between computer 500 and any external device. Network 506 transmits and receives data between computer 500 and devices and/or systems external to computer 500. In an exemplary embodiment, network 506 can be a managed IP network administered by a service provider. Network 506 can be a network internal to an aircraft, such as, for example, an avionics network, etc. Network 506 can be implemented in a wireless fashion, e.g., using wireless protocols and technologies, such as WiFi, WiMax, etc. Network 506 can also be a wired network, e.g., an Ethernet network, an ARINC 429 network, a controller area network (CAN), etc., having any wired connectivity including, e.g., an RS232 connection, R5422 connection, etc. Network 506 can also be a packet-switched network such as a local area network, wide area network, metropolitan area network, Internet network, or other similar type of network environment. The network 506 can be a fixed wireless network, a wireless local area network (LAN), a wireless wide area network (WAN) a personal area network (PAN), a virtual private network (VPN), intranet or other suitable network system.

If computer 500 is a PC, workstation, laptop, tablet computer and/or the like, the instructions in the memory 502 can further include a basic input output system (BIOS) (omitted for simplicity). The BIOS is a set of routines that initialize and test hardware at startup, start operating system 511, and support the transfer of data among the operatively connected hardware devices. The BIOS is typically stored in ROM 510 so that the BIOS can be executed when computer 500 is activated. When computer 500 is in operation, processor 501 can be configured to execute instructions stored within the memory 502, to communicate data to and from the memory 502, and to generally control operations of the computer 500 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a database of business cases correlated datasets comprising:
receiving, via a processor, a text string indicative of a business case topic;
parsing, using the processor, a dataset and isolating a plurality of data types in the dataset associated with the business case topic;
correlating, using the processor, the business case topic with one or more data types from the plurality of data types, wherein correlating the business case topic with the one or more data types from the plurality of data types comprises:
identifying, using the processor, a missing data type from the one or more data types, and
generating, using the processor, a case report based on a knowledge expansion database indicative of an option for acquiring the missing data type, wherein the case report is automatically generated by determining how the missing data type can be retrieved and writing a retrieval method in a data structure in the knowledge expansion database, wherein, responsive to determining that the missing data type can be retrieved from a private database accessible using credentials, recording, in the data structure, a website address for acquiring the credentials;
determining, using the processor, one or more data type links that associate the business case topic with each of the one or more data types;
evaluating, using the processor, each of the one or more data type links for a correlation to the business case topic, and assigning a confidence level value for the correlation, wherein the correlation is determined by performing a Monte Carlo simulation;
assigning, using the processor, a business value score for each of the one or more correlated data type links based on the confidence level value; and
generating, using the processor, a business case database using the plurality of data types, the confidence level for each data type link and the business value score for each data type link.

2. The computer-implemented method of claim 1, wherein the business value score is associated with an impact score for the business case topic.

3. The computer-implemented method of claim 1, wherein the dataset comprises a private database that is not publicly accessible, and a public database that is publicly accessible via the Internet.

4. The computer-implemented method of claim 1, wherein correlating the business case topic with the one or more data types from the plurality of data types further comprises:
isolating, using the processor, information associated with the business case topic from the dataset that affects the business value score by a predetermined threshold percentage.

5. The computer-implemented method of claim 4, wherein identifying the information associated with the business case topic comprises identifying, using the processor, one or more services or products associated with the business case topic.

6. The computer-implemented method of claim 4, wherein assigning the confidence level value comprises:
determining, with the processor, whether the missing data type is optional or necessary to generate the business case database, the determining based on whether the missing data affects the business value score more than a predetermined value.

7. The computer-implemented method of claim 6, wherein the determining is based on a percentage of references making reference to the missing data type.

8. The computer-implemented method of claim 1, wherein correlating the business case topic with the one or more data types from the plurality of data types comprises:
identifying, with the processor, whether the one or more data types are accessible;

parsing, with the processor, the dataset and identifying a new business case topic that is linkable to an existing data type;
identifying, with the processor, a missing data type for the new business case topic, and
ranking the missing data type for the new business case topic.

9. The computer-implemented method of claim 8, wherein the rank is made using a business value score.

10. The computer-implemented method of claim 8, the rank is made based on a number of existing data types that are already known and associated with the business case topic.

11. The computer-implemented method of claim 8, wherein the rank is made based on a cost basis associated with acquiring the missing data type.

12. The computer-implemented method of claim 8, wherein the rank is made based on a business value score associated with the new business case topic.

13. The computer-implemented method of claim 8, wherein the rank is made based on a relative ease of enablement of the new business case topic with respect to the missing data type.

14. A system for generating a database of business cases correlated datasets comprising:
a processor configured to:
receive a text string indicative of a business case topic;
parse a dataset and isolate a plurality of data types in the dataset associated with the business case topic;
correlate the business case topic with one or more data types from the plurality of data types, wherein correlating the business case topic with the one or more data types from the plurality of data types comprises:
identifying, using the processor, a missing data type from the one or more data types, and
generating, using the processor, a case report based on a knowledge expansion database indicative of an option for acquiring the missing data type, wherein the case report is automatically generated by determining how the missing data type can be retrieved and writing a retrieval method in a data structure in the knowledge expansion database, wherein, responsive to determining that the missing data type can be retrieved from a private database accessible using credentials, recording, in the data structure, a website address for acquiring the credentials;
determine one or more data type links that associate the business case topic with each of the one or more data types;
evaluate each of the one or more data type links for a correlation to the business case topic, and assigning a confidence level value for the correlation, wherein the correlation is determined by performing a Monte Carlo simulation;
assign a business value score for each of the one or more correlated data type links based on the confidence level value; and
generate a business case database using the plurality of data types, the confidence level for each data type link and the business value score for each data type link.

15. The system of claim 14, wherein the business value score is associated with an impact score for the business case topic.

16. The system of claim 14, wherein the dataset comprises a private database that is not publicly accessible, and a public database that is publicly accessible via the Internet.

17. The system of claim 14, wherein correlating the business case topic with the one or more data types from the plurality of data types comprises:
isolating, using the processor, information associated with the business case topic from the dataset that affects the business value score by a predetermined threshold percentage.

18. The system of claim 17, wherein identifying the information associated with the business case topic comprises identifying, using the processor, one or more services or products associated with the business case topic.

19. The system of claim 17, wherein assigning the confidence level value comprises:
determining, with the processor, whether the missing data type is optional or necessary to generate the business case database, the determining based on whether the missing data affects the business value score more than a predetermined value.

20. A computer program product for generating a database of business cases correlated datasets, the computer program product comprising a computer readable storage medium having program instructions embodied therewith, the program instructions executable by a processor to cause the processor to perform a method comprising:
receiving, via the processor, a text string indicative of a business case topic;
parsing a dataset using the processor and isolating a plurality of data types in the dataset associated with the business case topic;
correlating the business case topic with one or more data types from the plurality of data types, wherein correlating the business case topic with the one or more data types from the plurality of data types comprises:
identifying, using the processor, a missing data type from the one or more data types, and
generating, using the processor, a case report based on a knowledge expansion database indicative of an option for acquiring the missing data type, wherein the case report is automatically generated by determining how the missing data type can be retrieved and writing a retrieval method in a data structure in the knowledge expansion database, wherein, responsive to determining that the missing data type can be retrieved from a private database accessible using credentials, recording, in the data structure, a website address for acquiring the credentials;
determining one or more data type links that associate the business case topic with each of the one or more data types;
evaluating each of the one or more data type links for a correlation to the business case topic, and assigning a confidence level value for the correlation, wherein the correlation is determined by performing a Monte Carlo simulation;
assigning a business value score for each of the one or more correlated data type links based on the confidence level value; and
generating a business case database using the plurality of data types, the confidence level for each data type link and the business value score for each data type link.

* * * * *